United States Patent [19]

Chapman, Jr. et al.

[11] Patent Number: 4,904,735
[45] Date of Patent: Feb. 27, 1990

[54] PROCESSING AID FOR POLYMERS

[75] Inventors: George R. Chapman, Jr., Media, Pa.; Donnan E. Priester, Wilmington, Del.

[73] Assignee: E. I. Du Pont de Nemours and Company, Wilmington, Del.

[21] Appl. No.: 216,421

[22] Filed: Jul. 8, 1988

[51] Int. Cl.$^4$ .................... C08L 23/04; C08L 23/10; C08L 27/16; C08L 27/18
[52] U.S. Cl. .................................. 525/199; 525/200
[58] Field of Search ........................................ 525/199

[56] References Cited

U.S. PATENT DOCUMENTS

| | | | |
|---|---|---|---|
| 3,005,795 | 10/1961 | Busse et al. | 525/199 |
| 3,125,547 | 3/1964 | Blatz | 525/199 |
| 3,291,864 | 12/1966 | Eldridge et al. | 260/900 |
| 3,334,157 | 8/1967 | Larsen | 525/199 |
| 3,519,703 | 7/1970 | Merkl et al. | |
| 4,035,565 | 7/1977 | Apotheker et al. | 526/249 |
| 4,328,140 | 5/1982 | Singletary et al. | |
| 4,581,406 | 4/1986 | Hedberg et al. | 525/199 |
| 4,617,351 | 10/1986 | Heckel et al. | 525/199 |
| 4,740,341 | 4/1988 | Chu | 264/211 |
| 4,748,204 | 5/1988 | Kawashima et al. | 525/72 |
| 4,753,995 | 6/1988 | Chu et al. | 525/199 |
| 4,758,627 | 7/1988 | Wilkus et al. | 525/199 |
| 4,787,991 | 11/1988 | Morozumi et al. | 252/12.4 |

FOREIGN PATENT DOCUMENTS

| | | |
|---|---|---|
| 196903A | 3/1985 | European Pat. Off. |
| 282882A | 9/1988 | European Pat. Off. |
| 45-30574 | 10/1970 | Japan . |
| 55-025415 | 2/1980 | Japan .................... 525/199 |
| 58-143475A | 2/1982 | Japan . |
| 63-55543 | 11/1988 | Japan . |
| 63-55544 | 11/1988 | Japan . |
| 64-74247 | 3/1989 | Japan . |
| 1120131 | 7/1968 | United Kingdom . |

*Primary Examiner*—Carman J. Seccuro

[57] ABSTRACT

Polymer blend composition having improved processibility and comprising:
(a) a major portion of a difficultly melt-processible polymer, and
(b) a minor portion of:
  (1) at least an effective amount, to improve processibility, of a fluorocarbon copolymer which at the melt-processing temperature of (a) is either in a melted form if crystalline, or is above its glass transition temperature if amorphous, and
  (2) at least an effective amount, to improve processibility, of at least one tetrafluoroethylene homopolymer or copolymer of tetrafluoroethylene and at least one monomer copolymerizable therewith, wherein the mole ratio of fluorine to hydrogen is at least 1:1, and which is solid at the melt-processing temperature of (a);

masterbatches comprised of the processing aid; and processes utilizing the processing aid.

64 Claims, 1 Drawing Sheet

PROCESSING AID FOR POLYMERS

FIELD OF THE INVENTION

The present invention relates to a processing aid for polymers, and to polymers having improved processibility, particularly improved extrusion characteristics.

BACKGROUND

The melt extrusion of high molecular weight polymers, for example, hydrocarbon polymers, into shaped structures such as tubing, pipe, wire coating or film is accomplished by well-known procedures wherein a rotating screw pushes a heated, molten and viscous polymer melt through the extruder barrel into a die in which the polymer is shaped to the desired form and is then subsequently cooled and resolidified, by various means, into the general shape of the die.

In order to achieve low production costs it is desirable to extrude at high rates. Although the extrusion rate is readily increased by increasing the rate of revolution of the extruder screw, there is a technical limit to these increases because of the viscoelastic properties of the polymer. At rates above this limit the polymer may be mechanically heated to temperatures at which thermal decomposition can occur, or extrudates with a rough surface are obtained. The latter phenomenon can generate an undesirable pattern on the surface of the extrudate. One way of avoiding this occurrence is to extrude at a higher temperature, but this adds to the processing costs and makes cooling of the extrudate more difficult. More seriously many polyolefins are already extruded at temperatures near their decomposition temperatures, and further increases are not feasible.

It is desirable, therefore, to find highly efficient means of increasing the extrusion rate, without raising the melt temperature, while producing products with smooth surfaces. Changes in extruder and die configuration can improve melt flow but are not always practical or economically feasible Another approach involves the addition of conventional wax-type process aids which reduce bulk viscosity and in some cases improve processing properties. However, the efficiency is marginal and the high levels of additive required often adversely affect other properties. In Blatz, U.S. Pat. No. 3,125,547, it is disclosed that the use of 0.01-2.0 wt. % of a fluorocarbon polymer that is in a fluid state at process temperature, such as a fluoroelastomer, will reduce die pressure and significantly increase the extrusion rate at which melt fracture occurs for high and low density polyethylenes and other polyolefins. It is further taught in U.S. Pat. No. 3,125,547 that fluororesins which are solids at process temperature afford little or no improvements in extrusion characteristics of hydrocarbon polymers. By the term solid, it is meant that the fluororesin, if crystalline in nature, is not melted, or, if amorphous in nature, is not above the glass transition temperature.

Kamiya and Inui, in Japanese Patent Application Publication Kokoku No. 45-30574 (1970, examined) cite the use of crystalline fluorocarbon polymers at temperatures below their melting points to eliminate die build-up but say nothing of other extrusion improvements. Nishida, Tate and Kitani, in Japanese Patent Application Publication Kokai No. 62-64847, disclose injection molding compositions comprising an ethylene/alpha olefin copolymer having an MFR Of 0.2-200 g/10 min., a density of 0.850-0.945 g/cm3, and a Q value of 2.5-12, and 0.001-1% by weight of a fluorinated hydrocarbon polymer having an F/C ratio of at least 1:2.

Chu, in U.S. Pat. No. 4,740,341, discloses blends having improved extrudability and comprising a linear polymer of ethylene having incorporated therein 0.01-0.5 wt. %, based on the composition, of a fluorocarbon polymer having an F/C ratio of at least 1:2 and which is fluid at 120°-300° C., and 0.01-0.5 wt. %, based on the composition, of a polysiloxane.

Larsen, in U.S. Pat. No. 3,334,157, discloses polyethylene which has been modified to improve its optical properties by incorporating therein 0.015 to greater than 1.7 % by wt., based on the mixture, of finely divided polytetrafluoroethylene.

It is an object of this invention to provide resin compositions with substantially improved extrusion characteristics. It is another object to provide polymers which can be extruded at high rates to give extrudates of high surface quality. It is yet another object to provide polymers that can be extruded at low die pressures and at low melt temperatures. Another object is to provide a processing aid by means of which all the above can be achieved. A further object is to provide masterbatches of the processing aid. A still further object is to provide all the above with particular emphasis on high molecular weight hydrocarbon polymers which are susceptible to melt processing difficulties of the type discussed above. Other objects will become apparent hereinafter.

SUMMARY OF THE INVENTION The present invention provides a processing aid composition for difficultly melt-processible polymers. The processing aid consists essentially of, with the parts totaling 100%:

(a) 2-95 parts by weight of a fluorocarbon copolymer which at the melt-processing temperature of the difficultly melt-processible polymer is either in a melted form if crystalline or is above its glass transition temperature if amorphous; and (b) 98-5 parts by weight of a tetrafluoroethylene homopolymer or copolymer of tetrafluoroethylene and a monomer which is copolymerizable therewith, wherein the mole ratio of fluorine to hydrogen is at least 1:1, and which is solid at the melt-processing temperature of the difficultly melt-processible polymer.

The processing aid composition consists essentially of a minor portion of the processing aid and a major portion of a polymer, either a melt-processable or difficultly melt-processible polymer, or both, for example, a hydrocarbon polymer.

The present invention also provides a polymer blend composition having improved processibility and which comprises:

(a) a major portion of a difficultly melt-processible polymer, the host polymer, for example, a high molecular weight hydrocarbon homopolymer or copolymer of one or more hydrocarbon monomers, and (b) a minor portion of:
  (1) at least an effective amount to improve processibility, preferably to about 0.5 wt. %, based on the weight of (a), more preferably 0.002-0.08 wt. %, of a fluorocarbon copolymer wherein, preferably, the mole ratio of fluorine to hydrogen is at least 1:1.5, which at the melt-processing temperature of (a) is either in a melted form if crystalline, or is above its glass transition temperature if amorphous, and (2) at least an effective amount to improve processibility, preferably 0.002–0.08 wt. %, based on the weight of (a), of at least one tetrafluoroethylene homopolymer or copolymer of tetrafluoroethylene and at least one monomer copolymerizable therewith, wherein the mole ratio of fluorine to hydrogen is at least 1:1, and which is solid at the melt-processing temperature of (a).

For example, when the host polymer (a) is a hydrocarbon polymer, its melt-processing temperature generally will be in the range 100°–250° C.

Finally, the invention provides masterbatches containing the aforesaid processing aid; it provides processes for facilitating the processing of difficultly melt-processible polymers; and it provides difficultly melt-processible polymers containing the processing aid.

BRIEF DESCRIPTION OF THE DRAWINGS

The figure which is a part of this specification is a plot of die pressure (MPa) vs throughput (g/minute), showing the superior results achieved by means of this invention, as compared to those achieved by means of the prior art.

DETAILED DESCRIPTION OF THE INVENTION

In accordance with the present invention it has been discovered, surprisingly, that for the improvement of extrusion behavior, difficultly melt-processible polymers which contain combinations of fluorocarbon polymers (hereinafter called type (1) fluorocarbon polymers) that are above their melting points if crystalline, or above their glass transition temperatures if amorphous, and are thus molten and fluid at the polymer-processing temperatures, and crystalline or amorphous fluorocarbon polymers (herinafter called type (2) fluorocarbon polymers) that are solid at the polymer melt-processing temperatures, have significant advantage over such difficultly melt-processible polymers which contain equivalent, or even greater, amounts of extrusion-modifying additives of the art, as in U.S. Pat. No. 3,125,547 (supra). The term "extrusion behavior" is intended to include such parameters as the die pressure reached during extrusion, the operating melt temperatures and the maximum extrusion rates that can be achieved while maintaining melt stability and good extrudate surface quality. Thus, the compositions of this invention have much improved extrusion behavior, that is, reduced die pressure, higher allowable extrusion rates, and enhanced surface smoothness of extruded articles, and also, in the case of blown films, improved clarity, compared to polymers not containing types (1) and (2) fluorocarbon polymers.

The fluorocarbon polymers of type (1) are those that are fluid at the melt-processing temperature of the difficultly melt-processible polymer. Thus, at processing temperature they must be above their melting point if crystalline, or above their glass transition temperature if amorphous. Hence, the melting or softening point of these polymers preferably should be in the range 120° to 300° C. or below, more preferably, in the range 120° to 200° C. or below. The polymers should have sufficiently high molecular weight, with number average molecular weights greater than about 10,000, such that they do not exude from the difficultly melt-processible polymer extrudate at melt-processing temperatures. With respect to their chemical composition, it is preferred, but not essential, to employ fluorocarbon polymers having a fluorine to hydrogen ratio of at least 1:1.5. Fluorinated monomers which give rise to suitable polymers include vinylidene fluoride, hexafluoropropylene, chlorotrifluoroethylene, tetrafluoroethylene and perfluoroalkyl perfluorovinyl ethers. Specific examples of the fluorocarbon polymers of type (1) that may be employed in this invention include copolymers of vinylidene fluoride and a monomer selected from hexafluoropropylene, chlorotrifluoroethylene, 1-hydropentafluoropropylene and 2-hydropentafluoropropylene; copolymers of vinylidene fluoride, tetrafluoroethylene and hexafluoropropylene or 1- or 2-hydropentafluoropropylene; copolymers of tetrafluoroethylene and propylene and, optionally, vinylidene fluoride, all of which are known in the art. In some cases these copolymers may also include a bromo-containing monomer as taught in Apotheker and Krusic, U.S. Pat. No. 4,035,565, or terminal iodo-groups, as taught in U.S. Pat. No. 4,243,770. The latter patent also discloses the use of iodo group-containing fluoroolefin comonomers. When certain molar ratios of monomers are used in these copolymers, then the glass transition temperature is near or below 0° C., and these polymers are useful elastomers that are readily available articles of commerce.

The fluorocarbon polymers of type (2) that are solid at the melt processing temperature of the difficultly melt-processible polymer include homopolymers of tetrafluoroethylene and copolymers of tetrafluoroethylene with certain copolymerizable monomers. The selection of the fluorocarbon polymer of type (2) is not limited to high molecular weight polymers, whether the polymer is melt-processible or not melt-processible, whether the polymer is made by dispersion polymerization or suspension polymerization, or how much comonomer is present, except as stated above. For example, if excessive amounts of comonomer are used, the polymer will not be a solid at the temperature used for melt processing the difficultly melt-processible polymer; or, if a copolymer has too low a molecular weight, the copolymer may not be a solid at the temperature used for melt processing the difficultly melt-processible polymer. Suitable tetrafluoroethylene homopolymers include those that are high molecular weight and fibrillate, or do not fibrillate to a substantial extent, under shearing conditions, as well as those which are low molecular weight and non-fibrillating, such as those which have been subjected to ionizing radiation. Suitable monomers copolymerizable with tetrafluoroethylene to give melt-processible copolymers are ethylene, perfluoroolefins such as hexafluoropropylene, and perfluoro(alkyl vinyl ethers) such as perfluoro(propyl vinyl ether) and perfluoro(alkyl ethers) which contain functional groups such as —SO$_2$F or —COOCH$_3$. More than one comonomer may be used, provided all the aforesaid requirements are met.

The effect of the combined addition of fluorocarbon polymers types (1) and (2) in eliminating roughness of the extrudate, allowing increases in extrusion speed and reducing die pressures is significantly greater than when either type (1) or type (2) is used alone at concentrations equal to the sum of the concentrations of (1) and (2). It has been found that even when (1) and (2) are added at total concentrations as low as 0.0025 wt. %, all extrudate roughness is eliminated at extrusion shear rates well beyond 1000 sec$^{-1}$ (Example 2). Quantities in excess of 1 wt. % are not necessary. In general, if the fluorocarbon polymers are not compatible with the difficultly melt-processible polymer, that is to say, are not soluble in such polymer, the addition of higher levels serves no useful purpose, and when the incompatible fraction becomes too large, it may adversely affect the optical properties of the extrudate. Such is the case, for example, when the difficultly melt-processible polymer is a hydrocarbon polymer. The beneficial effects of even very low ratios of types (1) to (2) or types (2) to (1) are readily evident but, in general, there will be an optimum ratio of types (1) to (2) which may be determined experimentally for any particular combination of types (1) and (2). The weight ratio of fluorocarbon polymer type (1) to fluorocarbon polymer type (2) may vary from 2/98 to 95/5, preferably from 10/90 to 90/10.

When the difficultly melt-processible polymer is a hydrocarbon polymer, for example, a hydrocarbon polymer having a melt index (ASTM D-1238) at 190° C. of 5.0 or less, preferably 2.0 or less, the hydrocarbon polymer component of the composition of this invention may comprise an elastomeric copolymer of ethylene and propylene and, optionally, a non-conjugated diene monomer, for example, 1,4-hexadiene, or, in general, any thermoplastic hydrocarbon polymer obtained by the homopolymerization or copolymerization of a monoolefin(s) of the formula $CH_2=CHR$, where R is H or an alkyl radical, usually of not more than eight carbon atoms. In particular, this invention is applicable to polyethylene, both of the high density type and the low density type, for example, densities within the range 0.89 to 0.97; polypropylene; polybutene-1; poly(3-methylbutene); poly(methylpentene); and linear low density copolymers of ethylene and an alpha-olefin such as propylene, butene-1, octene-1, decene-1, octadecene, etc. Similarly, the invention is also applicable to blends of difficultly melt-processible polymers, and difficultly melt-processible polymers containing additives, such as antioxidants, light stabilizers, antiblocking agents, pigments, etc.

Because of the different melt characteristics of the different hydrocarbon polymers mentioned, the addition of the types (1) and (2) fluorocarbon polymers may be of greater value in some hydrocarbon polymers than in others. Thus, hydrocarbon polymers such as polypropylene and branched polyethylene, that are not of high molecular weight have good melt flow characteristics even at low temperatures, so that surface roughness and other surface defects can be avoided by adjustment of extrusion conditions. Such hydrocarbon polymers may not require the use of the fluorocarbon polymer additives of this invention, or be noticeably improved by them, except under unusual, adverse extrusion conditions. Such hydrocarbon polymers, therefore, are considered herein as not difficultly melt-processible polymers. However, other polymers such a high molecular weight, high density polyethylene or linear low density polyethylene copolymers, particularly those with narrow molecular weight distributions, do not have this degree of freedom in the variation of extrusion conditions and it is particularly with these resins that remarkable improvements in the surface quality of the extruded product are obtained with compositions containing the described type (1) and type (2) fluorocarbon polymers.

It will also be recognized by one skilled in the art that it may not be possible to achieve, simultaneously, reduced die pressure, increased throughput and improved surface quality to the maximum extent at given concentration of types (1) and (2). Thus, one might elect to attain maximum improvement in one parameter, in particular, at the expense of corresponding improvements in other parameters. For example, increased output of extrudate with high quality surface characteristics may not necessarily be accompanied by reduced die pressure. The best set of conditions will be determined by the specific requirements of the extrusion.

The addition of the fluorocarbon polymer modifiers to the difficultly melt-processible polymer can be accomplished by any of the means heretofore developed for the addition of modifiers to such polymers. For example, the fluorocarbon polymers (1) and (2) may be added independently to, for example, a hydrocarbon polymer on a rubber compounding mill or in a Banbury or other internal mixer or in a mixing extruder, in all of which the fluorocarbon polymers are uniformly distributed throughout the host polymer. It is also feasible to dry-blend the two fluoropolymers with the host polymer in the solid state, and then effect uniform distribution of the fluoropolymers in the melt extruder employed in the fabrication by using an extruder screw with good mixing capability.

Alternatively, masterbatch dispersions (mixtures) of types (1) and (2) in a diluent polymer, either together or separately, can be metered to the feed section of the extruder by appropriate devices. The diluent polymer can be a difficultly melt-processible polymer, or it can be a melt-processible polymer that does not substantially deleteriously affect the interaction of the aforesaid components (a), (b)(1) and (b)(2) in achieving the beneficial effects of the invention. For example, the diluent polymer can be a melt-processible hydrocarbon polymer, such as a homopolymer or copolymer of a monoolefin(s) of the formula $RCH=CH_2$ wherein R is H or an alkyl radical, usually of not more than eight carbon atoms. In most cases such a hydrocarbon polymer will have a melt index (ASTM D-1238) at 190° C. of 20.0 or less, preferably 5.0 or less. In preparing such masterbatches the amounts of fluorocarbon o polymers types (1) and (2) will usually be such that they provide 1-25 wt. %, preferably 1-10 wt. %, of the masterbatch. Further to the above regarding the need to avoid adversely affecting the beneficial effects of the invention, in preparing the masterbatch, the concentrations of types (1) and (2), as well as the diluent polymer, will be selected so as to achieve good mixing of all the ingredients. Particularly, fibrillation of the fluorocarbon polymer type (2) is to be avoided. In any of the above procedures, it is also possible to employ previously prepared mixtures of fluorocarbon polymer type (1) with fluorocarbon polymer type (2).

In the practice of this invention, it will be found that the beneficial effects are not necessarily observed immediately on the onset of extrusion, and depending on the overall concentrations of modifier, it may take from 10 minutes to 8 hours to reach stable extrusion rate and die pressure. Longer times are required at low concentrations of types (1) and (2). When it is desirable to operate at very low levels of modifiers and hasten the achievement of equilibrium, it may be expedient to first "condition" the extruder rapidly using a composition containing 0.1 to 1wt. % of the fluorocarbon polymers types (1) and (2), and then to switch to the desired concentrations of types (1) and (2).

Just as it has been observed that the beneficial effects may not be observed immediately, it has also been observed that the beneficial effects may continue to be observed after addition of the fluorocarbon polymers of types (1) and (2) is discontinued. Consistent with this observation, after stable extrusion rate and die pressure are achieved, the beneficial effects of the invention may be realized by alternating a feed of difficultly melt-processible polymer and one containing the processing aid of the invention.

The evaluations reported below employ a C. W. Brabender Computerized Plasti-Corder equipped with a 19.1 mm (¾ in.) diameter extruder with a 25/1 length-/diameter ratio. The screw has ten feed flights, 10 compression flights with a compression ratio of 3:1, and 5 metering flights. Operating parameters are controlled by five independent heating zones (No. 5 closest to the die), four pressure transducers and a torque-measuring drive unit with 1–120 rpm capability. The instrument is equipped with software for rheometric capillary extrusion testing. The capillary die, made from #416 nitrided stainless steel, has a diameter of 2 mm and a length of 40 mm, unless otherwise noted. In operation, the required machine conditions are set and the polymer is then extruded, usually at 40 rpm, until equilibrium (constant throughput and constant die pressure) is reached. For a linear low density polyethylene with a melt index at 190° C. of 1, extrusion at 40 rpm at 204° C. gives a throughput of about 19–20 g/min. and a die pressure of 28 MPa (Comparative Example 1). For experiments that are run in sequence, by changing the feed composition, the initial output parameters correspond to the previous equilibrium, and then gradually change to a new equilibrium. When equilibrium is achieved a range of screw speeds is then run to produce new equilibrium values of throughput and die pressure. The relation between throughput and die pressure is determined from a plot of the data, and die pressure data at certain fixed production rates can be estimated for comparison of data between experiments. Surface quality of the extrudate is judged by visual examination.

After each run the extruder is thoroughly cleaned. The equipment is first purged with a highly filled abrasive composition, for example, the commercially available UCC-DFD-0964. The capillary die is removed and heated with a propane torch until it is free of polymer and has reached a red glow. The extruder is disassembled and each section—screw, barrel, die assembly, and transducers—is cleaned, first with a wire brush, and then with methyl ethyl ketone solvent. After reassembly and calibration of the transducers, the unmodified hydrocarbon polymer is run first to establish equilibrium conditions, and to assure that reliable output is being obtained. For this purpose, the equilibrium value at 40 rpm, only, was sometimes used. If previously established equilibrium values for unmodified polymer are not achieved, the cleanout procedure is repeated.

In Table 1 the various materials used in the examples which follow are identified.

EXAMPLES

Comparative Example 1

Figure 1:
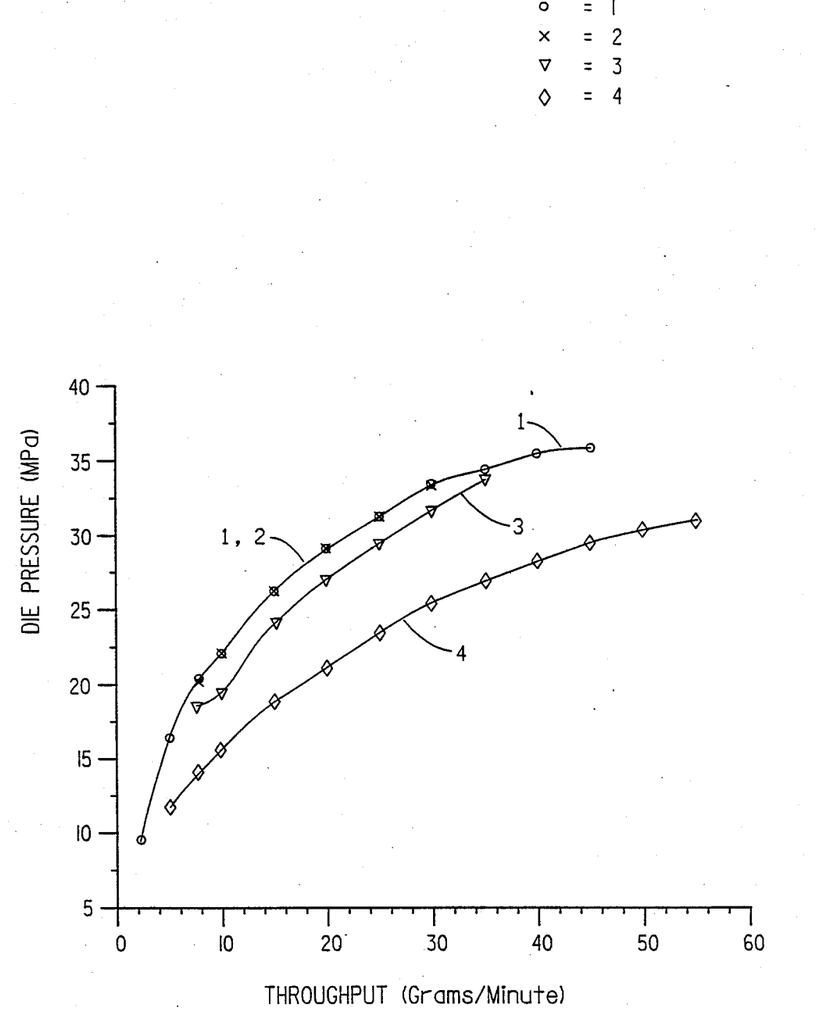

Hydrocarbon Polymer A was introduced to the extruder with the screw operating at 40 rpm and heating zones Nos. 1, 2, 3, 4 and 5 controlling at nominal temperature settings of 150°, 180°, 200°, 204°, and 204° C., respectively (No. 5 is closest to the die). Equilibrium extrusion conditions, when throughput and die pressure were constant, were reached after a period of 15 min. The screw rpm was then systematically varied from 12 rpm to 60 rpm. After determining the extrusion rate at various screw speeds, the data were input to a computer program which generated a curve of die pressure vs. throughput (shown in Curve 1 of the Figure which is a part of this specification). Selected values taken from Curve 1 are shown in Table 2. The extrudates of Hydrocarbon Polymer A had surface roughness at all extrusion rates above about 4 g/min.

Comparative Example 2

Hydrocarbon Polymer A which, as a dry blend, had intimately dispersed therein 0.1% of Fluorocarbon Polymer 2A, was added to the extruder just at the end of Comparative Example 1, at the same nominal temperature settings and at a screw speed of 40 rpm. Steady state was achieved after 10 min. and did not change after a further 240 min. The die pressure/throughput relationship was then obtained as in Comparative Example 1 and is shown in Curve 2 of the Figure. Data are shown in Table 2. There was no significant effect of Fluorocarbon Polymer 2A, alone, on the flow characteristics of Hydrocarbon Polymer A, and surface roughness appeared at all extrusion rates above about 4 g/min.

Comparative Example 3

An extruder warm-up was carried out as in Comparative Example 1 with unmodified Hydrocarbon Polymer A, giving the same results. Hydrocarbon Polymer A which, as a dry blend, had intimately dispersed therein 0.02 wt. % of Fluorocarbon Polymer 1A, was then added to the extruder at the same temperature settings and at a screw speed of 40 rpm. Steady state was achieved after 60 min. and did not change after a further 60 min. The die pressure/throughput relationship was then obtained as in Comparative Example 1 and is shown as Curve 3 in the Figure. Representative data are shown in Table 2. In this case there was an approximate 10% reduction in die pressure at a given throughput, compared to Comparative Example 1, and extrudates were smooth and glossy at extrusion rates below about 30 g/min.

Example 1

An extruder warm-up was carried out as in Comparative Example 1, giving the same results. Hydrocarbon Polymer A which, as a dry blend, had intimately dispersed therein 0.01 wt. % of Fluorocarbon Polymer 1A and 0.01 wt. % of Fluorocarbon Polymer 2A was then added at the same temperature settings and a screw speed of 40 rpm. A new equilibrium was established, after 180 min., at much lower pressures than for the hydrocarbon resin alone or for the composition of Comparative Example 3. The die pressure/throughput curve was then obtained as in Comparative Example 1, and is shown as Curve 4 in the Figure. Representative data are shown in Table 2. There was an approximately 30% drop in die pressure over the entire range, compared to Hydrocarbon Polymer A, even though the combined concentrations of Fluorocarbon Polymers 1A and 2A in this example is no greater than the concentration of Fluorocarbon Polymer 1A in Comparative Example 3. Extrudate surfaces were smooth and glossy throughout the range of extrusion rates attainable under the conditions of the example (up to 55 g/min., which is equivalent to a shear rate of about 1500 sec$^{-1}$). When a 1.5 mm diameter die was used in order to obtain shear rates up to about 3000 sec$^{-1}$, the extrudate was smooth and glossy over the entire range of extrusion rates.

Example 2

An extruder warm-up was carried out as in Example 1, with similar results. A dry blend of Hydrocarbon Polymer A having intimately dispersed therein 0.0005 wt. % of Fluorocarbon Polymer 1A and 0.0020 wt. % of Fluorocarbon Polymer 2A was then added at the same temperature settings and a screw speed of 40 rpm. The new equilibrium was established after 180 minutes, at a lower die pressure than for the hydrocarbon resin alone or for the composition of Comparative Example 3. The die pressure/extrusion rate curve was obtained as in Example 1 and representative data are shown in Table 2. There was an approximately 28% reduction in die pressure over the entire extrusion rate range compared to Hydrocarbon Polymer A, even though the combined concentrations of Fluorocarbon Polymers 1A and 2A is only 12.5% of the concentration of Fluorocarbon Polymer 1A in Comparative Example 3. Extrudate surfaces were smooth and glossy at extrusion rates below 55 g/min.

Example 3

In this example a series of compositions was evaluated to demonstrate the effect of the relative weight ratios of Fluorocarbon Polymer 1A to Fluorocarbon Polymer 2A, as shown in Table 3. Each composition was a dry blend of Fluorocarbon Polymers 1A and 2A in Hydrocarbon Polymer A, and after extruder warm-up as described in Example 1, each was added at the same temperature settings and a screw speed of 40 rpm. New equilibria were then established after 180 minutes, at lower die pressures than for the hydrocarbon resin alone or for the composition of Comparative Example 3. Die pressure/extrusion rate data were obtained as in Example 1 and are shown in Table 3. There is a significant reduction in die pressure over the entire range compared to Hydrocarbon Polymer A, even though the combined concentrations of Fluorocarbon Polymers 1A and 2A is no greater than the concentration in Comparative Example 3. Extrudate surfaces were smooth and glossy at extrusion rates up to 55 g/min.

Example 4

A composition of Hydrocarbon Polymer A containing an intimate dry powder mix of Fluorocarbon Polymers 1B and 2A, 0.01 wt. % of each, based on difficultly melt-processible polymer, was extruded and evaluated as in Example 1. A control experiment in which the difficultly melt-processible polymer contained 0.04 wt. % of Fluorocarbon Polymer 1B, alone, was also carried out. Data in Table 4 show that the composition of this invention extrudes at very much lower die pressures than the control and the extrudate is free of surface imperfections at much higher extrusion rates, even though it contains only half as much total modifier.

Example 5

A composition of Hydrocarbon Polymer A containing an intimate dry powder mix of Fluorocarbon Polymers 1C and 2A, 0.01 wt. % of each, based on hydrocarbon polymer, was extruded and evaluated as in Example 1. A control experiment in which the hydrocarbon polymer contained 0.04 part by wt. of Fluorocarbon Polymer 1C, alone, was also carried out. Data in Table 4 show that the composition of this example extrudes at very much lower die pressures than the control and the extrudate is free of surface imperfections at much higher extrusion rates, even though it contains only half as much total modifier.

Examples 6–10

For each example, Hydrocarbon Polymer A, which as a dry blend had intimately dispersed therein 0.01 wt. % of Fluorocarbon Polymer 1A and 0.01 wt. % of Fluorocarbon Polymers 2B, 2C., 2D, 2E, or 2F (Examples 6–10, respectively), was added to the extruder and treated in the manner described in Example 1. As shown by the data in Table 5, the new equilibria were then established after 180 minutes, at lower pressures than for the controls represented by Comparative Examples 1 and 3, Table 2. All extrudate surfaces were smooth and glossy throughout the range of extrusion rates up to 38 g/min. Compositions of Hydrocarbon Polymer A and 0.10 wt. % of any of the Fluorocarbon Polymers 2B, 2C., 2D, 2E and 2F, or 2F alone, showed no improvement in extrusion behavior (data not shown).

Examples 11 and 12

In these examples Hydrocarbon Polymers B and C were compared in formulations containing dry blends of Fluorocarbon Polymers 1A and 2A in the amounts shown in Table 6. Die pressure/extrusion rate data were evaluated as outlined in Example 1. For each example there is a control sample containing no additives and another showing the effect of Fluorocarbon Polymer 1A alone. Data were analyzed as in Example 1 and are shown in Table 6.

Example 13

In this experiment a chrome-plated, 2.54 cm (1 in.) wide slit die having a gap of 0.76 mm (0.03 in.) and a land length of 1.27 cm (0.5 in.) was used. A dry blend composition of Hydrocarbon Polymer A and 0.01 wt. % of each of Fluorocarbon Polymers 1A and 2A was fed at 60 rpm, giving the initial throughput and die pressure ratings indicated in Table 7. The initial extrudate had a rough dull surface. After 3 h the extrudate was smooth and glossy and there was a 17.5% reduction in die pressure as well as a 3.5% increase in throughput. The extrudate surface remained excellent up to the maximum throughput achievable with the extruder (55 g/min. at 120 rpm). In a similarly-run control experiment with Hydrocarbon Polymer A alone, the starting and final parameters were as shown in Table 7, and the extrudate had a dull rough surface at all extrusion rates above about 8 g/min. In another control experiment with 0.02 wt.% of Fluorocarbon Polymer 1A, there was only a 3% pressure drop after 3 h and nil increase in throughput. The extrudate surface was smooth and glossy at 60 rpm, but dull and rough in appearance at all higher screw speeds.

TABLE 1

| All are amorphous at room temperature and above. | |
|---|---|
| Type (1) Fluorocarbon Polymers: | |
| 1A: | A commercially available fluoroelastomer containing polymer repeat units of 60 wt. % vinylidene fluoride and 40 wt. % hexafluoropropylene and having a Mooney viscosity of 60 at 121° C. It was in the form of a fine powder which had been obtained by cryogenic grinding and had a light dusting of calcium carbonate as an antiblocking agent. |
| 1B: | A commercially available fluoroelastomer containing polymer repeat units of 45 wt. % |

TABLE 1-continued vinylidene fluoride, 30 wt. % hexafluoropropylene and 25 wt. % tetrafluoroethylene and having a Mooney viscosity of 80 at 121° C. It was ground and dusted as in 1A.

1C: A commercially available copolymer composed of polymer repeat units of tetrafluoroethylene, propylene and vinylidene fluoride.

Type (2) Fluorocarbon Polymers:

2A: A commercially available PTFE resin which has been irradiated, melts at 280° C., and has an average particle size of about 1 mm.

2B: A commercially available, high molecular weight, non-melt-processible PTFE, prepared by suspension polymerization, having a standard specific gravity of 2.16 and an average particle size of 35 micrometers.

2C: A commercially available powdered copolymer of tetrafluoroethylene and 12 wt. % of hexafluoropropylene and having a melt viscosity of 9,500 Ns/m$^2$ at 372° C.

2D: A commercially available powdered copolymer of tetrafluoroethylene and 3–4 wt. % of perfluoro(propyl vinyl ether) and having a melt viscosity of 4,700 Ns/m$^2$ at 372° C.

2E: A commercially available powdered copolymer of tetrafluoroethylene and 3–4 wt. % of perfluoro(propyl vinyl ether) and having a melt viscosity of 34,000 Ns/m$^2$ at 372° C.

2F: A commercially available powdered, essentially alternating copolymer of tetrafluoroethylene, ethylene and a small amount of a proprietary comonomer, and having a melt flow of 20 at 297° C. (ASTM-D3159).

Hydrocarbon Polymers

A: A high molecular weight, linear low density (d = 0.918) copolymer of ethylene and butene-1 having a melt index (ASTM D-1238, cond. E) of 1.0.

B: A high density polyethylene (d = 0.945) having a melt index of 0.05.

C: A low density (d = 0.925) polyethylene containing 5 wt. % of high density polyethylene and a small quantity of poly(vinyl acetate), and having a melt index of 0.50.

TABLE 2

| EXAMPLES | Comparative Examples | | | Example | Example |
|---|---|---|---|---|---|
|  | 1 | 2 | 3 | 1 | 2 |
| COMPOSITION (% by wt.) | | | | | |
| Hydrocarbon Polymer A | 100 | 99.9 | 99.95 | 99.98 | 99.975 |
| Fluorocarbon Polymer 2A | — | 0.1 | — | 0.01 | 0.002 |
| Fluorocarbon Polymer 1A | — | — | 0.02 | 0.01 | 0.0005 |
| Throughput (g/min.) | Die Pressure (MPa) | | | | |
| 2.1 | 9.9 | | | | |
| 5.0 | 16.4 | | | 11.7 | |
| 7.9 | 20.4 | 20.2 | 18.6 | 14.3 | |
| 10.0 | 22.1 | 22.1 | 19.6 | 15.6 | 14.9 |
| 15.0 | 26.3 | 26.3 | 24.1 | 18.9 | 18.0 |
| 20.0 | 29.1 | 29.1 | 27.0 | 21.1 | 20.2 |
| 25.0 | 31.3 | 31.3 | 29.5 | 23.4 | 22.4 |
| 30.0 | 33.5 | 33.4 | 31.7 | 25.4 | 24.5 |
| 35.0 | 34.3 | | 33.7 | 26.9 | |
| 40.0 | 35.4 | | | 28.3 | |
| 45.0 | 35.8 | | | 29.4 | |
| 50.0 | | | | 30.4 | |
| 55.0 | | | | 30.9 | |
| Surface | R, D above 4 g/min. | R,D above 4 g/min. | S,G at 29 g/min. and below | S, G to 55 g/min. | S, G to 55 g/min. |

S — smooth
G — glossy
R — rough
D — dull

TABLE 3

| | EXAMPLE 3 | | | | | |
|---|---|---|---|---|---|---|
| | A | B | C | D | E | F |
| COMPOSITION (% by wt.) | | | | | | |
| Hydrocarbon Polymer A | 99.980 | 99.980 | 99.980 | 99.980 | 99.980 | 99.980 |
| Fluorocarbon Polymer 2A | 0.0196 | 0.019 | 0.018 | 0.016 | 0.002 | 0.001 |
| Fluorocarbon Polymer 1A | 0.0004 | 0.001 | 0.002 | 0.004 | 0.018 | 0.019 |
| Wt. ratio 1A/2A | 2/98 | 5/95 | 10/90 | 20/80 | 90/10 | 95/5 |
| Throughput (g/min.) | Die Pressure (MPa) | | | | | |
| 10 | 15.1 | 7.7 | 8.4 | 11.5 | 18.3 | 17.3 |
| 15 | 18.5 | 9.9 | 10.7 | 14.2 | 21.8 | 21.1 |
| 20 | 21.0 | 11.8 | 13.1 | 16.3 | 24.6 | 24.1 |
| 25 | 23.3 | 13.9 | 15.8 | 18.2 | 26.9 | 26.8 |
| 30 | 25.4 | 16.0 | 18.6 | 20.2 | 28.8 | 29.2 |
| Surface | all extrudates were smooth and glossy up to 55 g/min. | | | | | |

TABLE 4

| | Control | Example 4 | Control | Example 5 |
|---|---|---|---|---|
| COMPOSITION (% by wt.) | | | | |

TABLE 4-continued

|  | Control | Example 4 | Control | Example 5 |
|---|---|---|---|---|
| Hydrocarbon Polymer A | 99.96 | 99.98 | 99.96 | 99.98 |
| Fluorocarbon Polymer 2A | — | 0.01 | — | 0.01 |
| Fluorocarbon Polymer 1B | 0.04 | 0.01 | — | — |
| Fluorocarbon Polymer 1C | — | — | 0.04 | 0.01 |
| Throughput (g/min.) | \multicolumn{4}{c}{Die Pressure (MPa)} | | | |
| 10 | 17.4 | 8.7 | 22.3 | 19.7 |
| 15 | 21.5 | 10.9 | 26.8 | 23.6 |
| 20 | 24.5 | 12.7 | 29.6 | 26.0 |
| 25 | 27.1 | 14.8 | 31.7 | 28.3 |
| 30 | 29.4 | 17.0 | 33.3 | 30.4 |
| Surface | S, G below 38 g/min. | S, G below 55 g/min. | S, G below 28 g/min. | S, G to 55 g/min. |

S — smooth
G — glossy
R — rough
D — dull

TABLE 5

| Examples | 6 | 7 | 8 | 9 | 10 |
|---|---|---|---|---|---|
| COMPOSITION (% by wt.) | | | | | |
| Hydrocarbon Polymer A | 99.98 | 99.98 | 99.98 | 99.98 | 99.98 |
| Fluorocarbon Polymer 1A | 0.01 | 0.01 | 0.01 | 0.01 | 0.01 |
| Fluorocarbon Polymer 2B | 0.01 | — | — | — | — |
| Fluorocarbon Polymer 2C | — | 0.01 | — | — | — |
| Fluorocarbon Polymer 2D | — | — | 0.01 | — | — |
| Fluorocarbon Polymer 2E | — | — | — | 0.01 | — |
| Fluorocarbon Polymer 2F | — | — | — | — | 0.01 |
| Throughput (g/min.) | | Die Pressure (MPa) | | | |
| 10 | 19.3 | 20.0 | 19.8 | 19.3 | 18.4 |
| 15 | 23.2 | 22.7 | 23.8 | 23.7 | 22.6 |
| 20 | 25.9 | 25.2 | 27.0 | 26.7 | 25.6 |
| 25 | 28.4 | 27.6 | 29.6 | 29.4 | 23.3 |
| 30 | 30.6 | 29.7 | — | 31.7 | 30.7 |
| Surface | all surfaces smooth and glossy below 38 g/min. | | | | |

TABLE 6

|  | Control | Control | Example 11 | Control | Control | Example 12 |
|---|---|---|---|---|---|---|
| COMPOSITION (% by wt.) | | | | | | |
| Hydrocarbon Polymer B | 100 | 99.96 | 99.98 | — | — | — |
| Hydrocarbon Polymer C | — | — | — | 100 | 99.92 | 99.96 |
| Fluorocarbon Polymer 1A | — | 0.04 | 0.01 | — | 0.08 | 0.02 |
| Fluorocarbon Polymer 2A | — | — | 0.01 | — | — | 0.02 |
| Throughput (g/min.) | | | Die Pressure (MPa) | | | |
| 10 | 25.4 | 19.0 | — | — | — | — |
| 15 | unstable | 19.6 | 17.9 | 12.4 | 11.9 | 11.5 |
| 20 | unstable | 21.5 | 19.3 | 13.6 | 13.1 | 12.9 |
| 25 | unstable | — | — | 14.7 | 14.2 | 14.0 |
| 30 | unstable | — | — | 15.7 | 15.0 | 14.9 |
| Surface | R, D above 10 g/min. | S, G to 23 g/min. | S, G to 23 g/min. | S, G to 38 g/min. | S, G to 38 g/min. | S, G to* 38 g/min. |

S — smooth
G — glossy
R — rough
D — dull
*These extrudates did not have the occasional cloudy streaks that appeared in the controls.

TABLE 7

|  | Control | Control | Example 13 |
|---|---|---|---|
| COMPOSITION (% by wt.) | | | |
| Fluorocarbon Polymer 1A | — | 0.02 | 0.02 |
| Fluorocarbon Polymer 2A | — | — | 0.02 |
| Starting pressure, MPa | 25.4 | 25.6 | 25.1 |
| Starting throughput, g/min. | 25.7 | 24.7 | 24.7 |
| Ending pressure, MPa | 25.4 | 24.8 | 19.7 |
| Ending throughput, g/min. | 25.7 | 24.9 | 25.8 |
| Surface | rough | smooth glossy | smooth glossy |

We claim:

1. Polymer blend composition having improved processibility and comprising:
   (a) a major portion of a difficultly melt-processible polymer comprising at least one mono-olefin polymer, and
   (b) a minor portion of:
   (1) at least an effective amount, to improve processibility, of a fluorocarbon copolymer which at the melt-processing temperature of (a) is either in a melted form if crystalline, or is above its glass transition temperature if amorphous, and
   (2) at least an effective amount, to improve processibility, of at least one tetrafluoroethylene homopolymer or copolymer of tetrafluoroethylene and at least one monomer copolymerizable therewith, wherein the mole ratio of fluorine to hydrogen is at least 1:1, and which is solid at the melt-processing temperature of (a).

2. Composition of claim 1 wherein (a) is a hydrocarbon polymer.

3. Composition of claim 2 wherein the polymer is a homopolymer or copolymer of one or more monoolefins of the formula RCH=CH$_2$ wherein R is H or alkyl.

4. Composition of claim 3 wherein alkyl is C$_{1-8}$ alkyl.

5. Composition of claim 2 wherein the polymer is a high density polyethylene.

6. Composition of claim 2 wherein the polymer is a low density polyethylene.

7. Composition of claim 2 wherein the polymer is a linear low density polyethylene copolymer.

8. Composition of claim 2 where the polymer is a copolymer comprised of polymer repeat units of ethylene, propylene and a non-conjugated diene.

9. Composition of claim 1 wherein the amount of (b)(1) is no more than 0.5 wt. %, based on the weight of (a).

10. Composition of claim 9 wherein the amount of (b)(1) is 0.002–0.08 wt. %, based on the weight of (a).

11. Composition of claim 9 wherein the amount of (b)(2) is 0.002–0.08 wt. %, based on the weight of (a).

12. Composition of claim 1 wherein, in component (b)(1), the mole ratio of fluorine to hydrogen is at least 1:1.5.

13. Composition of claim 1 wherein the melting or softening point of component (b)(1) is in the range 120°–300 C.. or below.

14. Composition of claim 13 wherein the melting or softening point of component (b)(1) is in the range 120°–200° C. or below.

15. Composition of claim 1 wherein component (b)(1) is a fluorocarbon copolymer of vinylidene fluoride, hexafluoropropylene, chlorotrifluoroethylene, tetrafluoroethylene or a perfluoroalkyl perfluorovinyl ether.

16. Composition of claim 15 wherein component (b)(1) is a copolymer of vinylidene fluoride and a monomer selected from hexafluoropropylene, chlorotrifluoroethylene, 1-hydropentafluoropropylene and 2-hydropentafluoropropylene; a copolymer of vinylidene fluoride, tetrafluoroethylene and hexafluoropropylene or 1- or 2-hydropentafluoropropylene; or a copolymer of tetrafluoroethylene and propylene.

17. Composition of claim 16 wherein the copolymer includes polymer repeat units of a bromo- or iodo group-containing monomer.

18. Composition of claim 1 wherein component (b)(2) is polytetrafluoroethylene.

19. Composition of claim 1 wherein component (b)(2) is a copolymer of tetrafluoroethylene and one or more monomers selected from ethylene, a perfluoroolefin, a perfluoro(alkyl vinyl ether) or a perfluoro(alkyl vinyl ether) containing a functional group.

20. Composition of claim 19 wherein the monomer is ethylene.

21. Composition of claim 19 wherein the monomer is hexafluoropropylene.

22. Composition of claim 19 wherein the monomer is perfluoro(propyl vinyl ether).

23. Composition of claim 19 wherein the functional group is —SO$_2$F or —CO$_2$CH$_3$.

24. Composition of claim 1 wherein the weight ratio of component (b)(1) to component (b)(2) is within the range 2:98 to 95:5.

25. Composition of claim 24 wherein the weight ratio of component (b)(1) to component (b)(2) is within the range 10:90 to 90:10.

26. Processing aid composition for a difficultly melt-processible polymer, said composition consisting essentially of:
   (a) a major portion of a hydrocarbon polymer comprising at least one mono-olefin polymer, and
   (b) a minor portion of, with the parts totaling 100 parts:
      (1) 2–95 parts by weight of a fluorocarbon copolymer which at the melt-processing temperature of the difficultly melt-processible polymer is either in a melted form if crystalline or is above its glass transition temperature if amorphous; and
      (2) 98–5 parts by weight of a tetrafluoroethylene homopolymer or copolymer of tetrafluoroethylene and a monomer which is copolymerizable therewith, wherein the mole ratio of fluorine to hydrogen is at least 1:1, and which is solid at the melt-processing temperature of the difficulty melt-processible polymer.

27. Composition of claim 26 wherein the combined amounts of component (b)(1) and component (b)(2) comprise 1–25 wt. % of the composition.

28. Composition of claim 27 wherein the combined amounts of component (b)(1) and component (b)(2) comprise 1–10 wt. % of the composition.

29. Composition of claim 26 wherein the hydrocarbon polymer is a difficulty melt-processible polymer.

30. Composition of claim 26 wherein the hydrocarbon polymer is a homopolymer or copolymer of one or more monoolefins of the formula RCH=CH$_2$ wherein R is H or alkyl.

31. Composition of claim 30 wherein alkyl is C$_{1-8}$ alkyl.

32. Composition of claim 26 wherein the amount of component (b)(1) is 10–90 parts and the amount of component (b)(2) is 90–10 parts.

33. Composition of claim 26 wherein the mole ratio of fluorine to hydrogen in component (b)(1) is at least 1:1.5.

34. Composition of claim 26 wherein the melting or softening point of component (b)(1) is in the range 120°–300° C. or below.

35. Composition of claim 34 wherein the melting or softening point of component (b)(1) is in the range 120°–200° C. or below.

36. Composition of claim 26 wherein component (b)(1) is a fluorocarbon copolymer of vinylidene fluoride, hexafluoropropylene, chlorotrifluoroethylene, tetrafluoroethylene or a perfluoroalkyl perfluorovinyl ether.

37. Composition of claim 36 wherein component (b)(1) is a copolymer of vinylidene fluoride and a monomer selected from hexafluoropropylene, chlorotrifluoroethylene, 1-hydropentafluoropropylene and 2-hydropentafluoropropylene; a copolymer of vinylidene fluoride, tetrafluoroethylene and hexafluoropropylene or 1- or 2-hydropentafluoropropylene; or a copolymer of tetrafluoroethylene and propylene.

38. Compositon of claim 37 wherein the copolymer includes polymer repeat units of a bromo- or iodo group-containing monomer.

39. Composition of claim 26 wherein component (b)(2) is polytetrafluoroethylene.

40. Composition of claim 26 wherein component (b)(2) is a copolymer of tetrafluoroethylene and one or more monomers selected from ethylene, a perfluoroolefin, a perfluoro(alkyl vinyl ether) or a perfluoro(alkyl vinyl ether) containing a functional group.

41. Composition of claim 40 wherein the monomer is ethylene.

42. Composition of claim 40 wherein the monomer is hexafluoropropylene.

43. Composition of claim 40 wherein the monomer is perfluoro(propyl vinyl ether).

44. Composition of claim 40 wherein the functional group is or —SO$_2$F or —CO$_2$CH$_3$.

45. Extrusion process comprising melt extruding a difficultly melt-processible polymer comprising at least one mono-olefin polymer and having incorporated therein an effective amount, to improve processibility, of a processing aid consisting essentially of, with the parts totaling 100 parts:
(a) 2-95 parts by weight of a fluorocarbon copolymer which at the melt-processing temperature of the difficultly melt-processible polymer is either in a melted form if crystalline or is above its glass transition temperature if amorphous; and
(b) 98-5 parts by weight of a tetrafluoroethylene homopolymer or copolymer of tetrafluoroethylene and a monomer which is copolymerizable therewith, wherein the mole ratio of fluorine to hydrogen is at least 1:1, and which is solid at the melt-processing temperature of the difficultly melt-processible polymer.

46. Process of claim 45 wherein the mole ratio of fluorine to hydrogen in component (a) is at least 1:1.5.

47. Process of claim 45 wherein the melting or softening point of component (a) is in the range 120°-300° C. or below.

48. Process of claim 47 wherein the melting or softening point of component (a) is in the range 120°-200° C. or below.

49. Process of claim 45 wherein component (a) is a fluorocarbon copolymer of vinylidene fluoride, hexafluoropropylene, chlorotrifluoroethylene, tetrafluoroethylene or a perfluoroalkyl perfluorovinyl ether.

50. Process of claim 49 wherein component (a) is a copolymer of vinylidene fluoride and a monomer selected from hexafluoropropylene, chlorotrifluoroethylene, 1-hydropentafluoropropylene and 2-hydropentafluoropropylene; a copolymer of vinylidene fluoride, tetrafluoroethylene and hexafluoropropylene or 1- or 2-hydropentafluoropropylene; or a copolymer of tetrafluoroethylene and propylene.

51. Process of claim 50 wherein the copolymer includes polymer repeat units of a bromo- or iodo group-containing monomer.

52. Process of claim 45 wherein component (b) is polytetrafluoroethylene.

53. Process of claim 45 wherein component (b) is a copolymer of tetrafluoroethylene and one or more monomers selected from ethylene, a perfluoroolefin, a perfluoro(alkyl vinyl ether) or a perfluoro(alkyl vinyl ether) containing a functional 54. Process of claim 53 wherein the monomer is ethylene.

55. Process of claim 53 wherein the monomer is hexafluoropropylene.

56. Process of claim 53 wherein the monomer is perfluoro(propyl vinyl ether).

57. Process of claim 53 wherein the functional group is —SO$_2$F or —CO$_2$CH$_3$.

58. Process of claim 45 wherein the amount of component (a) is 10-90 parts and the amount of component (b) is 90-10 parts.

59. Composition of claim 18 wherein the polytetrafluoroethylene is low molecular weight and non-fibrillating.

60. Composition of claim 18 wherein the polytetrafluoroethylene has been subjected to ionizing radiation.

61. Composition of claim 39 wherein the polytetrafluoroethylene is low molecular weight and non-fibrillating.

62. Composition of claim 39 wherein the polytetrafluoroethylene has been subjected to ionizing radiation.

63. Process of claim 52 wherein the polytetrafluoroethylene is low molecular weight and non-fibrillating.

64. Process of claim 52 wherein the polytetrafluoroethylene has been subjected to ionizing radiation.

* * * * *

UNITED STATES PATENT AND TRADEMARK OFFICE
CERTIFICATE OF CORRECTION

| | | |
|---|---|---|
| PATENT NO. | : 4,904,735 | Page 1 of 1 |
| APPLICATION NO. | : 07/216421 | |
| DATED | : February 27, 1990 | |
| INVENTOR(S) | : George R. Chapman, Jr. et al. | |

It is certified that error appears in the above-identified patent and that said Letters Patent is hereby corrected as shown below:

column 10, line 63 "121" should read --100--.

Signed and Sealed this

Seventh Day of November, 2006

JON W. DUDAS
*Director of the United States Patent and Trademark Office*